Feb. 4, 1930.    R. CARTER, JR    1,745,738
UNLOADING CLUTCH
Filed April 17, 1928
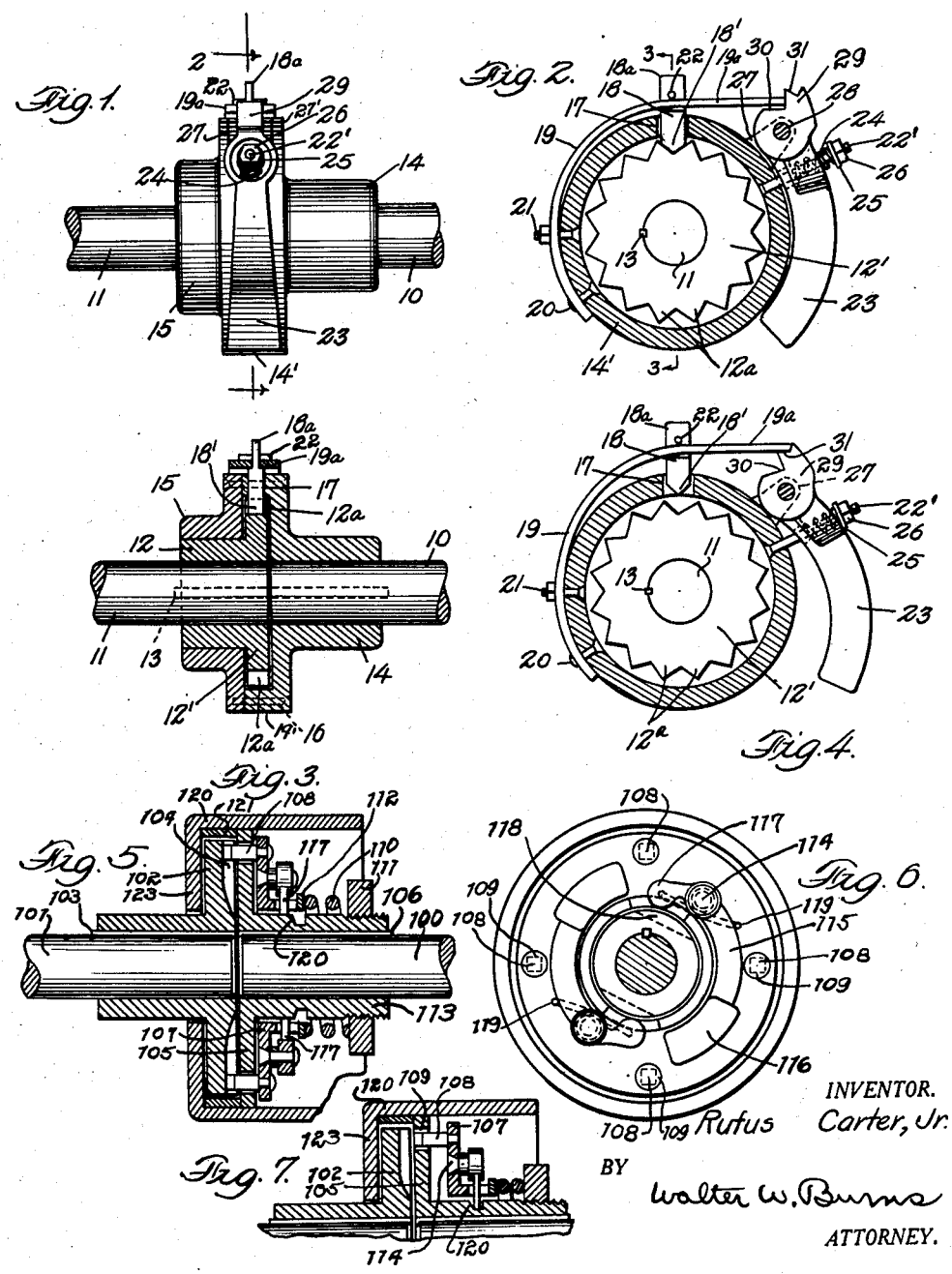
INVENTOR.
Rufus Carter, Jr.
BY
Walter W. Burns
ATTORNEY.

Patented Feb. 4, 1930

1,745,738

UNITED STATES PATENT OFFICE

RUFUS CARTER, JR., OF CHICAGO, ILLINOIS

UNLOADING CLUTCH

Application filed April 17, 1928. Serial No. 270,755.

This invention relates to unloading clutches for rotating members, particularly intended to release by predetermined load or overload and remain until one member, such as the driver, stops or nearly stops rotating.

In certain types of machines, where abnormal conditions may occur, it is very desirable to have a releasing device in the power transmission, when the load conditions become such as to endanger the parts or require resetting or a rearrangement of the work.

When released, it is found to be desirable in such a device to have the same stay in a condition of release until one of the revolving members, as the driver, comes to rest.

The primary object of my invention is the provision of an improved clutch for power connection between two members and to provide for the automatic disconnection of power transmission therebetween.

Another object of my invention is the provision of an improved clutch, between a driving member and a driven member, which will automatically disconnect the members from operative relation and will maintain this inoperative relation until one of the members has practically or absolutely come to a standstill.

Another and further object of my invention is the provision of a clutch which will release automatically when the torque between the two members becomes greater than the amount of torque desired to be carried and will remain in a released condition until the driving member has ceased or practically ceased rotating when the connection will be automatically made.

Referring to the drawing wherein I have illustrated a preferred embodiment of my invention, Fig. 1 is a side elevational view of my invention.

Fig. 2 is a cross sectional view on the line 2—2 of Fig. 1.

Fig. 3 is a cross sectional view on the line 3—3 of Fig. 2.

Fig. 4 is a view similar to Fig. 2 but with the parts disconnected to show the relation after the disconnection operation.

Fig. 5 is a cross section of a modified form of my invention.

Fig. 6 is an end view of the form shown in Fig. 5.

Fig. 7 is a fragmental view of the same form showing parts in operated position.

Similar reference characters refer to the same parts throughout the several views of the drawing.

My device which contemplates the driving connection between two coaxial rotating members such as shafts, is provided with a means for disconnection between the two rotating members.

There is also a device for maintaining the disconnection until the rotation of one shaft has practically stopped. While not essential, I have found, for most purposes, that it is more advantageous to have this latter means connected to be controlled by the speed of the driving member.

The numeral 10 designates a driving member as a shaft and 11 a driven member as a shaft. On the driven shaft 11, I have placed a hub 12 having a notched wheel 12'. This notched wheel 12' is keyed to the shaft 11 by a key 13. On the shaft 10, is a hub 14 provided with a rim 14' to which is secured a ring 15 which encloses the outer periphery of the notched wheel 12' and extends to the surface of the hub 12, there being sufficient clearance between the adjacent surfaces to permit relative movement.

This ring 15 and the rim 14' are secured together in any suitable manner as by the rivets 16.

In the surface of the rim 14' is an opening 17 in which is located a detent member 18 having a wedge-shaped bottom 18' which occupies one of the spaces between the teeth 12$^a$ of the notched wheel 12'. This detent 18 has an elongated flat outer end 18$^a$ which passes through a correspondingly shaped opening in a spring member 19 which is secured to the rim 14' by means of bolts or rivets 20, 21. A pin 22 passes through the outer end 18$^a$ of the detent 18 and limits the movement of the latter in the opening of the spring member 19 through which this outer end 18$^a$ passes. The spring member 19 is provided with an extension 19ª, for a purpose to be presently described.

It will be noted that the detent member 18 and the notched wheel 12' are so arranged that when in operation the tendency will be for the detent 18 to move outwardly, this tendency being normally overcome by the action of the spring 19.

In order to carry out the objects of the invention, it is necessary to hold the detent 18 out of operation until one of the rotating members, the driver for example, has practically stopped rotating.

In order to illustrate this part of my invention, I have shown a means for cooperating with the extension 19ª, so constructed that when the detent 18 moves upwardly, the extension 19ª will hold the detent out of operation. A threaded bolt 22' is fastened in the outside of the rim 14'. Loosely mounted on this bolt 22' is a weight member 23 having most of its weight at one side of the bolt 22'.

The opening in the weight member 23 is large enough, at its outer end, to permit the insertion of the spring 24. At its inner end, the opening is large enough to loosely surround the body of the bolt 22'. The opening thus described forms substantially a cup for the spring 24. On the outer end of the bolt 22' are located a washer 25 and a nut 26.

In order to hold the weight member 23 in proper position, I have shown a pair of lugs 27, 27' located on the rim 14' and ring 15, respectively, which carry a pintle pin 28 on which is pivoted the head 29 of the weight member 23.

The head member 29 is provided with two cut-away portions 30 and 31. The cut-away portion 30 is occupied by the end of the spring member 19ª when the detent 18 is in engagement with a notch of the notched wheel 12'.

When, during the transmission of power, the action and reaction between the spring 19, the detent 18 and the notched wheel 12', causes the detent 18 to move outwardly from the axis of rotation, then the outer end of the extension 19ª of the spring 19, moves outwardly beyond the lower edge of the cut-away portion 31 of the head 29. Since the parts are rotating about the shaft axis, there is centrifugal force tending to move the weight member 23 outwardly. This release of the weight member 23 permits it to fly outwardly about the pintle pin 28 as a center. As soon as the outer end of the spring member 19ª passes the edge of the lower edge of the cut away place 31, the weight 23 swings outwardly until the outer end of the spring member extension 19ª engages the wall of the cut-away place 31.

It will be clear that with the parts in this position, any slight rotation will keep the weight member in its outer position and the detent member 18 away from the notches of the notched wheel 12'. The slope of the inner side of the cut-away portion 31 is preferably such that the outer end 19ª of the spring 19 will be raised slightly after the detent 18 has cleared the notches of the notched wheel 12' and during the outward movement of weight member 23 from the position shown in Fig. 2 to that shown in Fig. 4.

The conditions, under which the detent 18 will be separated from its notch of the wheel 12', are affected by the strength of the spring 19, the weight of the detent 18 and its distance from the axis of rotation, the weight of the weight member 23 and its leverage, the shape of the cut-away portion 30 of the head 29, and the shape of the notches of the wheel 12' and the cooperating surfaces of the inner end of the detent 18.

By increasing the strength of the spring 19, a greater torque may be required to separate the detent and its notch of the notched wheel 12'. By constructing the detent 18 with substantial weight, or by increasing its distance from the rotating center, the speed will have an appreciable effect on the releasing action.

By increasing the weight of the weight member 23 or its lever arm, the speed will have an effect on its outward holding ability to cause an easier release under some conditions in the cut-away portion 30 and a more difficult release under other conditions. A change in the shape of the face of the portion of the cut-away portion 30, engaged by the outer end 19ª of the spring 19, may make an easier or a more difficult release depending upon whether the turning of the member 23 tends, by pressing on the end of the extension 19ª, to hold it in, force it out, or not affect its tendency to move.

It will be seen from the foregoing that as long as the centrifugal action keeps the weight 23 outward to a position where the outer end of the spring extension 19ª engages the cut-away portion 31, the two shafts 10 and 11 will remain disconnected. When, however, the speed of the shaft carrying the weight member 23 decreases until the weight 23 drops when above the shaft axis, then the spring extension 19ª will be brought back into engagement with the cut-away portion 30 by action of the spring 19. This brings all the parts back to their normal positions, the end of the detent returning to the nearest notch in the notched wheel 12'.

While one such mechanism has been described, it is to be understood that there may be two or more distributed about the periphery of the mechanism which would distribute and equalize the centrifugal action of the parts.

Referring to Figures 5, 6 and 7 where another form of my invention is illustrated, 100 designates a rotating driving member as a shaft and 101, a rotating driven member as a shaft.

Fixedly keyed to the rotary driven member 101 is a flanged wheel 102 keyed by the key 103. This wheel 102 has notches 104 in its periphery for a purpose to be later described.

Mounted on the rotary driving member 100 is a sleeved flange member 105 which is keyed thereto by the key 106. This key 106 securely holds the flange member 105 against axial and rotative motion.

A sliding disk 107 is mounted about the flange member 105 to move axially therealong. Adjacent its outer periphery are spaced four pins 108 which pass through openings 109 in the flange member 105. The ends of the pins 108 are wedge shaped and are complementary in shape to the notches 104 of the wheel 102.

The sliding disk 107 is normally held in a position close to the flange member 105 (to the left of Fig. 5) by the spring member 110. This spring member 110 is held between the nut 111 and the washer 112 which latter bears against the sliding disk 107. The nut 111 is threaded to the sleeve portion 113 of the flange member 105. By moving the nut 111 inwardly or outwardly, the torque between the driving and driven members, at which the release takes place, can be controlled.

Mounted on the sliding disk 107 is a lever pivoted at 114, and having a centrifugal arm 115 having a weight 116 at its end and at the opposite end a detent 117. Adjacent the detents 117 are two notches 118 in the sleeve 113. A spring 119 surrounds the pivot 114 and engages the lever 115 to tend to hold the weight 116 normally against the cylindrical portion of the flange member 105. This spring 119 may be just sufficient to hold the weight 116 against gravity or it may be less than sufficient or greater than sufficient depending upon the desired conditions.

The notches 118 are provided with inner inclined surfaces 120 for a purpose to be described.

Closely fitting the outside of the flange member 105 is a housing 120. This housing 120 is provided with a spacer 121 which is placed between the housing flange 123 and the outer periphery of the flange member 105.

In operation, the driving member, as the shaft 100, turns, transmitting its power through the flange member 105, the pins 108, the notches 104 of the notched wheel 102 to the driven member 101. The spring 110 holds the pins 108 in contact with the notched wheel 102. When the torque between the driving and driven members 100 and 101 becomes great enough the wedge shape of the notches 104 forces the wedge ends of the pins 108 backwardly against the spring 110. As the spring 110 is compressed by the outward movement of the sliding disk 107, the points of the wedges approach the points of the wedges between the notches. With this movement the detents 117 are moved toward the notches 118. When the detents 117 pass over the edges of the notches, the weights 116 are released. Since they are being forced outwardly by centrifugal action, the release permits them to move outwardly until the detents 117 engage the bottoms of the notches 118. As the detents 117 pass down the inclined sides 120 of the notches 118, the wedge points of the pins 118 are cleared entirely from the notches 104. The driving and driven members are then separated and are free to move relatively to each other. As long as the rotation of the driving member is sufficient to cause centrifugal action enough to overcome the action of the springs 119 and the force of gravity on the weights 116 when in their highest position, the detents will hold the pins 108 out of engagement with the coacting notches.

When the speed of the rotating member, as the driving shaft 100, decreases until the spring 119 can overcome the centrifugal action and the action of gravity on the weight 116, then the weights 116 will return to the positions shown in Fig. 6 and the spring 110 is released for operation. As soon as released, the spring 110 forces the sliding disk 107 inward bringing the ends of the pins 108 into contact with the notches 104 of the notched wheel 102. The driving and driven members are now connected and ready for power transmission.

In certain places, face plates or other rotating members may replace the shafts 100 and 101.

A clutch, constructed according to my invention, automatically comes back into operative relation as soon as the rotating part carrying the control mechanism stops rotating. That this is done without manual operation is a great convenience and time saver.

While I have illustrated in detail an embodiment of my invention, I desire to have it understood that the showing and description are merely illustrative and that modifications and changes may be made without departing from the spirit of the invention and within the scope of the appended claims.

Having described my invention, what I claim is:—

1. A self releasing clutch comprising rotating driving and driven members having coactive rotative connection therebetween, means for releasing the coaction between the two members under predetermined power conditions and means controlled by the rotative movement for retaining the parts in released condition until one of the members has substantially stopped rotating and for causing the resumption of coaction between the two members when the speed has decreased to a desired minimum.

2. A self releasing clutch comprising rotating driving and driven members having coactive rotative connection therebetween, means for releasing the coaction between the two members under a predetermined torque load and means controlled by the rotative movement for retaining the parts in released condition until one of the members has substantially stopped rotating and for causing the resumption of coaction between the two members when the speed has decreased to a desired minimum.

3. A self releasing clutch comprising rotating driving and driven members having coactive rotative connection therebetween, means for releasing the coaction between the two members under predetermined power conditions and means, including a centrifugal weight member, for retainng the parts in released condition until one of the members has substantially stopped rotating and for causing the resumption of coaction between the two members when the speed has decreased to a desired minimum.

4. A self releasing clutch comprising rotating driving and driven members having coacting rotative connection therebetween, means for releasing the coaction between the two members under predetermined power conditions and means, including a centrifugally operated lever, for retaining the parts in released condition until one of the members has substantially stopped rotating and for causing the resumption of coaction between the two members when the speed has decreased to a desired minimum.

5. A self releasing clutch comprising rotating driving and driven members, a notched wheel rotating with one of said members, a movable notch-coacting member rotating with the other rotating member, means for normally holding the notch-coacting member in engagement with the wheel and for releasing the notch-coacting member under predetermined power conditions and means controlled by the rotative movement for retaining the parts in released condition until one of the rotating members has substantially stopped rotating and for causing the resumption of coaction between the two members when the speed has decreased to a desired minimum.

6. A self releasing clutch comprising rotating driving and driven members, a notched wheel rotating with one of said members, a movable notch-coacting member rotating with the other rotating member, spring means form normally holding the notch-coacting member in engagement with the wheel until the predetermined power conditions are exceeded and for then releasing the notch-coacting member and means controlled by the rotative movement for holding the spring means inoperative until one of the rotating members has substantially stopped rotating and for causing the spring to be released to cause coaction between the notched wheel and its coacting member when the speed has decreased to a desired minimum.

7. A self releasing clutch comprising rotating driving and driven members, a notched wheel rotating with one of said members, a notch-coacting member rotating with the other rotating member and having a bodily movement radially relative thereto, spring means for normally holding the notch-coacting member in engagement with the wheel until the predetermined power conditions are exceeded and for then releasing the notch-coacting member and means controlled by the rotative movement for holding the spring means inoperative until one of the rotating members has substantially stopped rotating and for causing the spring to be released to cause coaction between the notched wheel and its coacting member when the speed has decreased to a desired minimum.

8. A self releasing clutch comprising rotating driving and driven members having coactive rotative connection therebetween, means including a spring, for normally maintaining the coaction between the two members under predetermined power conditions and for relasing the coaction when the predetermined power conditions are exceeded, and means including a centrifugally operated device for holding the spring inoperative until the rotative speed has reached a desired minimum.

9. A self releasing clutch comprising rotating driving and driven members, a notched wheel rotating with one of said members, a movable notch-coacting member rotating with the other rotating member and bodily movable relative thereto in a radial direction, a spring for normally maintaining the notch coacting member in engagement with the notched wheel, a pivoted centrifugally operated member for holding the spring and notch coacting member in inactive condition and for releasing the spring to again cause coactive relation between the notched wheel and its coacting member when the speed has decreased to a desired mininmum.

In testimony whereof I hereunto affix my signature.

RUFUS CARTER, Jr.